(12) United States Patent
Truesdel

(10) Patent No.: US 11,619,035 B2
(45) Date of Patent: *Apr. 4, 2023

(54) CURB STOP DEVICE

(71) Applicant: Russell T. Truesdel, Batesville, IN (US)

(72) Inventor: Russell T. Truesdel, Batesville, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/572,126

(22) Filed: Jan. 10, 2022

(65) Prior Publication Data

US 2022/0127828 A1    Apr. 28, 2022

Related U.S. Application Data

(63) Continuation of application No. 17/082,296, filed on Oct. 28, 2020, now Pat. No. 11,255,075.

(60) Provisional application No. 62/927,145, filed on Oct. 29, 2019.

(51) Int. Cl.
*E03B 9/10* (2006.01)
*F16K 27/12* (2006.01)

(52) U.S. Cl.
CPC ............. *E03B 9/10* (2013.01); *F16K 27/12* (2013.01); *Y10T 137/6999* (2015.04); *Y10T 137/7017* (2015.04)

(58) Field of Classification Search
CPC ...... E03B 9/06; E03B 9/10; F16L 5/10; F16K 27/12

See application file for complete search history.

(56) References Cited

U.S. PATENT DOCUMENTS

| | | |
|---|---|---|
| 996,596 A | 6/1911 | Lindner |
| 1,108,031 A | 8/1914 | Tyler et al. |
| 2,099,479 A | 11/1937 | Heinkel et al. |
| 2,691,384 A | 10/1954 | Mueller et al. |
| 4,030,519 A | 6/1977 | Zinn |
| 4,064,902 A | 12/1977 | Swenson |
| 4,239,056 A | 12/1980 | Shope |
| 4,308,886 A | 1/1982 | Handley et al. |
| 4,310,015 A | 1/1982 | Stewart et al. |
| 4,325,405 A | 4/1982 | Christo |
| 4,331,178 A | 5/1982 | Handley et al. |
| 4,333,494 A | 6/1982 | Shope |
| 4,534,378 A | 8/1985 | Gagas et al. |
| 4,556,081 A | 12/1985 | Gagas |
| 4,572,236 A | 2/1986 | Baker |
| 4,691,733 A | 9/1987 | Zinn |
| 4,819,687 A | 4/1989 | Alberico et al. |
| 4,905,725 A | 3/1990 | Sinkinson et al. |
| 5,327,925 A | 7/1994 | Ortel |

(Continued)

FOREIGN PATENT DOCUMENTS

| | | |
|---|---|---|
| CA | 3000722 A1 | 10/2018 |
| EP | 0115407 A2 | 8/1984 |

(Continued)

*Primary Examiner* — Kevin F Murphy
(74) *Attorney, Agent, or Firm* — Adam W. Borgman

(57) ABSTRACT

A curb stop device for aligning a curb stop box and a valve is disclosed herein. The curb stop device may include a side wall and a bottom wall, with the bottom wall including one or more flexible tabs and an inner aperture. The inner aperture may be configured to receive the valve, such as a water shut-off valve.

5 Claims, 7 Drawing Sheets

(56) References Cited

U.S. PATENT DOCUMENTS

| | | | |
|---|---|---|---|
| 5,394,898 A | 3/1995 | Turner | |
| 5,404,899 A * | 4/1995 | Zabel | F16K 43/00 |
| | | | 137/368 |
| 5,634,488 A | 6/1997 | Martin | |
| 5,664,597 A * | 9/1997 | Miskiewicz | F16K 27/12 |
| | | | 220/23.6 |
| 5,671,772 A | 9/1997 | Bliss | |
| 5,730,180 A | 3/1998 | Alberico | |
| 5,738,140 A | 4/1998 | Mann | |
| 5,871,030 A | 2/1999 | Agbay | |
| 5,950,654 A | 9/1999 | Paylor | |
| 5,983,925 A | 11/1999 | Miller | |
| 6,202,675 B1 | 3/2001 | Forte | |
| 6,354,325 B1 | 3/2002 | Warnes et al. | |
| 6,536,462 B1 | 3/2003 | Laugen | |
| 6,802,337 B2 | 10/2004 | Phipps | |
| 7,117,883 B1 | 10/2006 | Vitalo | |
| 7,556,239 B2 | 7/2009 | Beebe | |
| 7,575,018 B2 | 8/2009 | Smith | |
| 7,703,474 B2 | 4/2010 | Gagas | |
| 7,870,867 B2 | 1/2011 | Agbay | |
| 8,047,221 B1 | 11/2011 | Tenor | |
| 8,091,571 B2 | 1/2012 | Weisz et al. | |
| D745,949 S | 12/2015 | Meyer et al. | |
| D764,637 S | 8/2016 | Ducote et al. | |
| 9,518,369 B2 | 12/2016 | Ducote et al. | |
| 9,856,632 B2 | 1/2018 | Roell et al. | |
| 11,255,075 B2 * | 2/2022 | Truesdel | F16K 27/12 |
| 2007/0044841 A1 | 3/2007 | Gagas | |
| 2008/0023076 A1 | 1/2008 | Weisz et al. | |
| 2009/0065519 A1 | 3/2009 | Kearby et al. | |
| 2009/0304445 A1 | 12/2009 | Salas | |
| 2016/0169408 A1 | 6/2016 | Smith | |
| 2016/0252187 A1 | 9/2016 | Roell | |

FOREIGN PATENT DOCUMENTS

| | | |
|---|---|---|
| GB | 2517308 A | 2/2015 |
| KR | 101171870 B1 | 8/2012 |

* cited by examiner

CURB STOP DEVICE

PRIORITY CLAIM

This application is a continuation of U.S. application Ser. No. 17/082,296, filed Oct. 28, 2020, which claims priority under 35 U.S.C. § 119(e) to U.S. Provisional Application Ser. No. 62/927,145, filed Oct. 29, 2019, each of which is expressly incorporated by reference herein.

TECHNICAL FIELD

The present disclosure relates to curb stop devices. More particularly, the present disclosure relates to curb stop devices that may help align curb stop boxes that extend from ground surface to a valve that may be turned off and on selectively to selectively prevent or allow the flow of water.

BACKGROUND

Residential, commercial, and other structures are often supplied with water via a water supply line from an external source. It is often necessary to shut the water supply off for any of variety of reasons. Water supply lines are often provided with a shut-off valve to facilitate stopping or inhibiting the water flow therethrough. For example, a shut-off valve may include a valve body and the valve may be selectively turned off and on, or closed and opened, by rotating or moving the valve. Water supply lines and shut-off valves are often buried underground, for example, below the frost line to prevent or inhibit freezing of the water supply line and/or to protect it from the external environment.

A curb stop box may be provided, for example, to facilitate access to the water supply line and/or shut-off valve. Because the water supply line and/or shut-off valve may be buried underground, the curb stop box may extend from the water supply line and/or shut-off valve to the ground surface to provide access from the ground surface to the water supply line and/or shut-off valve to turn it off and on as desired without the need to dig in the ground in an attempt to find the water supply line and/or shut-off valve. The curb stop box may extend into the ground over such an underground valve to provide a passageway through which a tool can be extended down into the curb stop box for turning the valve on and off.

SUMMARY

According to the present disclosure, certain embodiments of a curb stop device are provided that may protect and facilitate and/or maintain alignment of a curb stop box with a supply line and/or valve to facilitate access to and actuation of a valve on the supply line. The curb stop device may be configured with an inner aperture for receiving a valve and/or valve operating member to be actuated by a user, and a plurality of slots adjacent at least one deflectable tab to facilitate installation of the curb stop device on the valve body and/or resilient engagement of the curb stop device on the valve body.

In one aspect, for instance, a curb stop device is provided that has a side wall having an outer surface that has at least one of a height and an outer dimension configured to engage a curb stop box. An interior region is defined by a side wall inner surface of the side wall and a bottom wall upper surface. An inner is aperture formed in the bottom wall and configured to receive at least a portion of a valve into the interior region. A plurality of flexible tabs are arranged around the inner aperture, each of the flexible tabs extending from a base coupled to the bottom wall radially inwardly toward a tip proximate the inner aperture. A plurality of slots are provided, with each slot extending radially between each of the flexible tabs. The tabs are configured to flex axially upwardly and downwardly to accommodate the valve and to engage the valve to maintain the valve in alignment with the curb stop box.

In another aspect, for instance, a curb stop assembly is providing that includes a curb stop box and a curb stop device. The curb stop box has a top portion disposed opposite a bottom portion. The bottom portion of the curb stop box is configured to receive the curb stop device. The curb stop device includes a side wall configured to engage the bottom portion of the curb stop box. The curb stop device has an inner aperture formed in a bottom wall, the inner aperture configured to receive at least a portion of a valve. The curb stop device has a plurality of flexible tabs arranged around the inner aperture, each of the flexible tabs extending from a base coupled to the bottom wall radially inwardly toward a tip proximate the inner aperture. The curb stop device also has a plurality of slots, with each slot extending radially between each tab of the plurality of flexible tabs. The tabs are configured to flex axially upwardly and downwardly to accommodate the valve and to engage the valve to maintain the valve in alignment with the curb stop box.

In yet another aspect, for instance, a curb stop device is provided that includes a cylindrical side wall coupled to a bottom wall. The bottom wall extends radially outwardly from a central axis toward the cylindrical side wall. The bottom wall includes at least four flexible tabs. Each flexible tab is separated from an adjacent flexible tab by a radially extending slot, and the bottom wall includes at least four radially extending slots. Each slot of the at least four radially extending slots has a first end adjacent an inner aperture. The inner aperture is disposed at the central axis of the bottom wall. The inner aperture is configured to receive at least a portion of a valve.

Additional features of the present disclosure will become apparent to those skilled in the art upon consideration of the illustrative embodiments exemplifying the best mode of carrying out embodiments of the invention as provided in the disclosure as presently perceived.

BRIEF DESCRIPTION OF THE DRAWINGS

Embodiments now will be described more fully hereinafter with reference to the accompanying drawings, in which some, but not all embodiments may be shown. Indeed, embodiments may be illustrated or described in many different forms and the present disclosure should not be construed as limited to the embodiments set forth herein. Like numbers refer to like elements throughout, and wherein.

DETAILED DESCRIPTION

Figure 1:
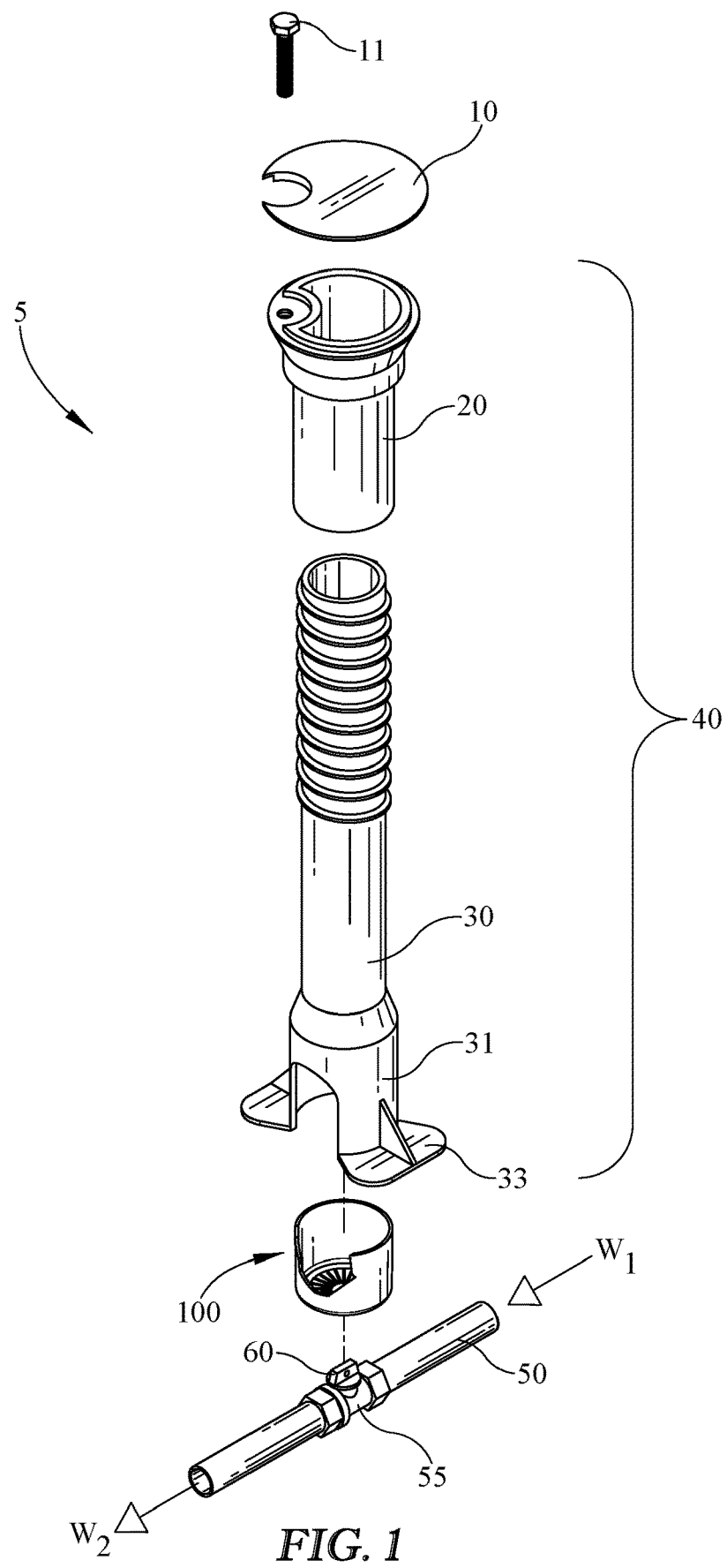
FIG. 1 illustrates a perspective view of an embodiment of a flow control assembly shown as an exploded assembly.

A curb stop device 100 for a curb stop box 40, as shown for example in FIG. 1, is disclosed herein. Such a curb stop device can be used, for example, in combination with curb stop box 40 and/or as part of a flow control assembly 5. Curb stop box 40 may be provided, for example, to facilitate access to a water supply line 50 and/or a shut-off valve 55. Water supply line 50 and/or shut-off valve 55 may be buried underground, for example. Curb stop box 40 may extend upwardly from water supply line 50 and/or shut-off valve 55 toward the ground surface to provide access from the ground surface to water supply line 50 and/or shut-off valve 55 to turn it off and on as desired without the need to dig in the ground in an attempt to find water supply line 50 and/or shut-off valve 55. A user may insert a shut-off tool, such as a T-bar or the like (not shown), for example, through a passageway in or through curb stop box 40. Curb stop box 40 may include an axially and/or longitudinally extending passageway, for example, through a hollow central area. The T-bar may engage a valve operating member 60 of shut-off valve 55 so that, for example, a user may rotate the T-bar at or above the ground surface to cause rotation and/or actuation of valve operating member 60 and in turn selectively open and/or close shut-off valve 55 and supply line 50, and selectively permit or prohibit water flow out $W_2$ from water flow in $W_1$. Curb stop box 40 may extend into the ground over valve 55, which may be underground, for example to hold the passageway through curb stop box 40 in alignment with valve operating member 60 so a tool can be extended down into curb stop box 40 for turning valve 55 on and off.

Water supply line 50 and/or shut-off valve 55 may include one or more generally round or cylindrical pipes. For example, shut-off valve 55 may be located within water supply line 50 and/or valve operating member 60 may extend from water supply line 50 so as to be accessible from the top. A user may selectively allow or block water flow $W_1$ through water supply line 50 by switching shut-off valve 55 between an open position and a closed position, which may result in water flow out $W_2$. It is understood that, while water supply line 50 is used as an example, curb stop box 40 and/or curb stop device 100 may be configured for use with a gas pipe and/or gas shut-off valve, with any other utility shut-off apparatus, with other apparatus or equipment, or with any combination thereof.

Figure 2:
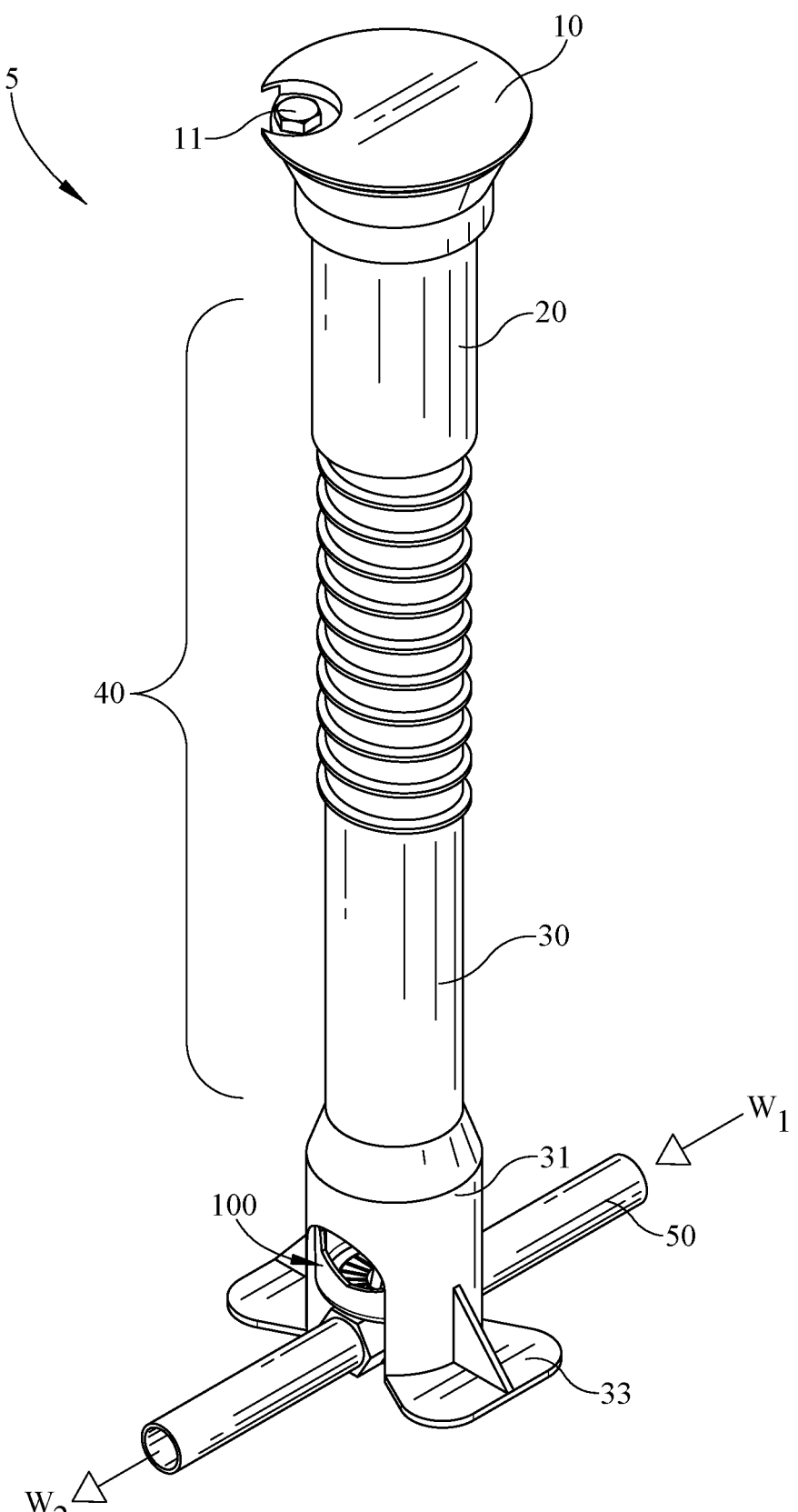
FIG. 2 illustrates a perspective view of the flow control assembly of FIG. 1 shown assembled.

Curb stop box 40, as shown for example in FIGS. 1 and 2, may include a top portion 20 and/or a bottom portion 30. Top portion 20 and bottom portion 30 may be adjustably attachable, for example, by including a threaded engagement as shown that may allow height adjustment depending on how deep water supply line 50 is located underground, if it is located underground. A box lid 10 may be provided for any of a variety of reasons, including but not limited to blocking access to curb stop box 40 and/or shut-off valve 55, to prevent or inhibit debris from falling into or entering the internal passageway of curb stop box 40 and/or curb stop device 100, or for any other reason or any combination of reasons. Box lid 10 may be securable to curb stop box 40 and/or top portion 20, for example, by an attachment device or bolt 11.

Bottom portion 30 of curb stop box 40 may include a bottom end 31, which may include one or more gaps, recesses, apertures, or the like to accommodate water supply line 50, as shown for example in FIGS. 1 and 2. For example, bottom end 31 may include a substantially upside-down U-shaped recess on opposite sides so that it may be inserted or installed from above water supply line 50 without interfering with supply line 50 and allowing a bottom flange 33 of bottom end 31 to be at or below water supply line 50. Bottom flange 33 may provide a supporting surface to facilitate holding curb box 40 upright and/or may provide a surface for attaching and/or coupling bottom flange 33 to an underlying surface or structure. For example, bottom flange 33 may be fastened and/or bolted or the like to an underlying ground surface, concrete footer, or the like.

Curb stop device 100 may be sized, shaped, and/or configured to be insertable into bottom end 31 of curb stop box 40. Curb stop device 100 may be sized, shaped, and/or configured to be insertable over valve operating member 60, as discussed more below. For example, curb stop device 100 may be attached onto valve 55 and/or valve operating member 60 and curb stop box 40 may be inserted onto curb stop device 100 such that curb stop device 100 helps align curb stop box 40 and/or its internal passageway with valve operating member 60. Curb stop device 100 may help maintain such alignment after installation, for example, resisting forces from ground shifting, back filling, or the like and/or may help prevent debris and/or dirt from preventing or inhibiting access to valve 55 and/or valve operating member 60.

The embodiment of curb stop device 100 shown in FIGS. 3 through 7 may be configured to at least partially receive curb stop box 40 from the top and at least partially receive valve 55 and/or valve operating member 60, or any portion thereof from the bottom. In this way, for example, curb stop device 100 may facilitate alignment of curb stop box 40 with shut-off valve 55 and/or valve operating member 60. This may help prevent or resist unalignment or misalignment of curb stop box 40 with valve 55, as might otherwise occur for example due to natural settling of the ground over time, or even during installation of curb stop box 40 during which time filling in with dirt, sand, and/or water may tend to shift or move curb stop box 40 out of alignment with valve 55. Furthermore, instead of or in addition to facilitating and/or maintaining alignment, or for any other reason, curb stop device 100 may prevent or resist ingress of debris into curb stop box 40 and/or valve 55 when installed thereon and/or coupled thereto.

Figure 3:
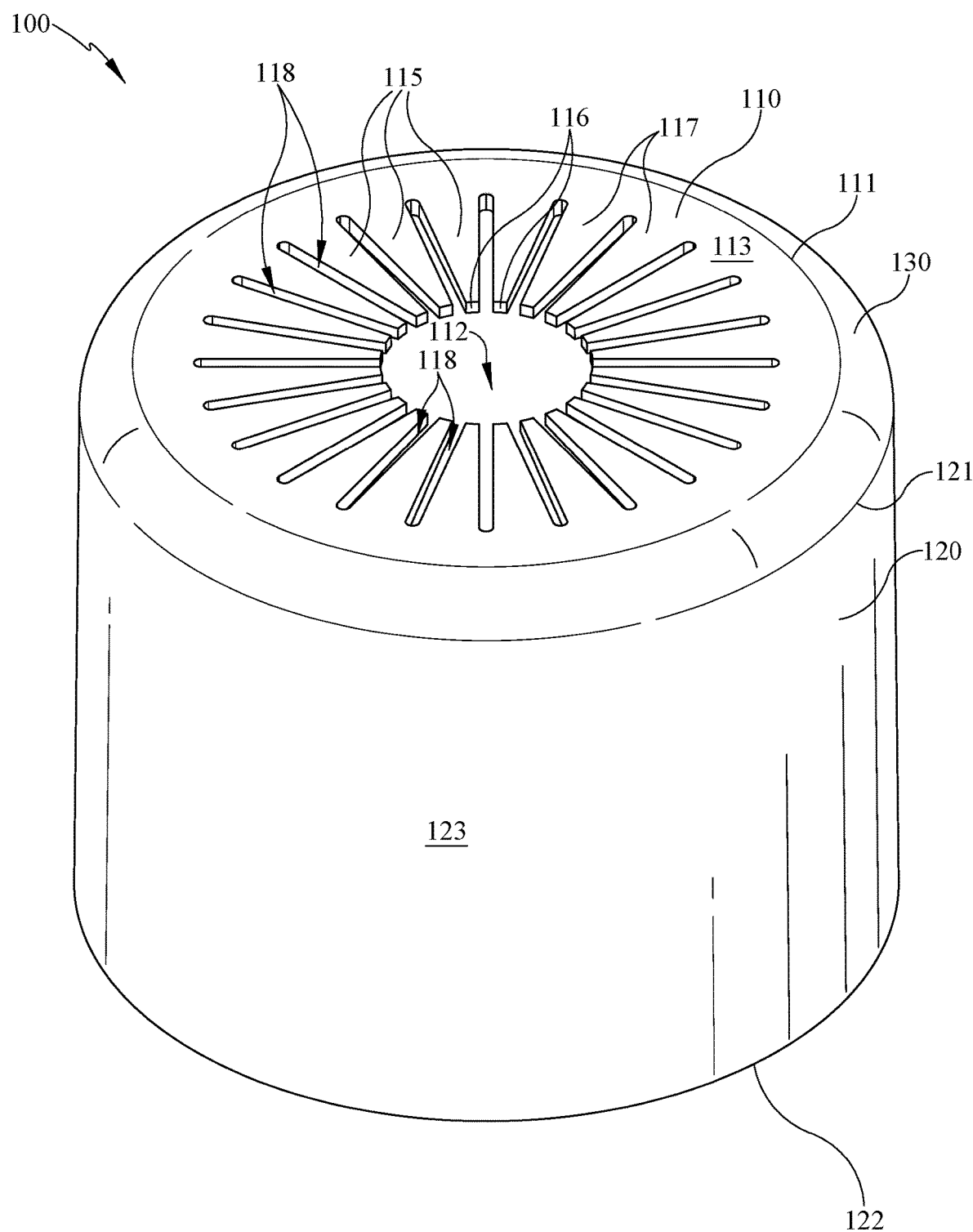
FIG. 3 illustrates a bottom perspective view of an embodiment of a curb stop device.
Figure 4:
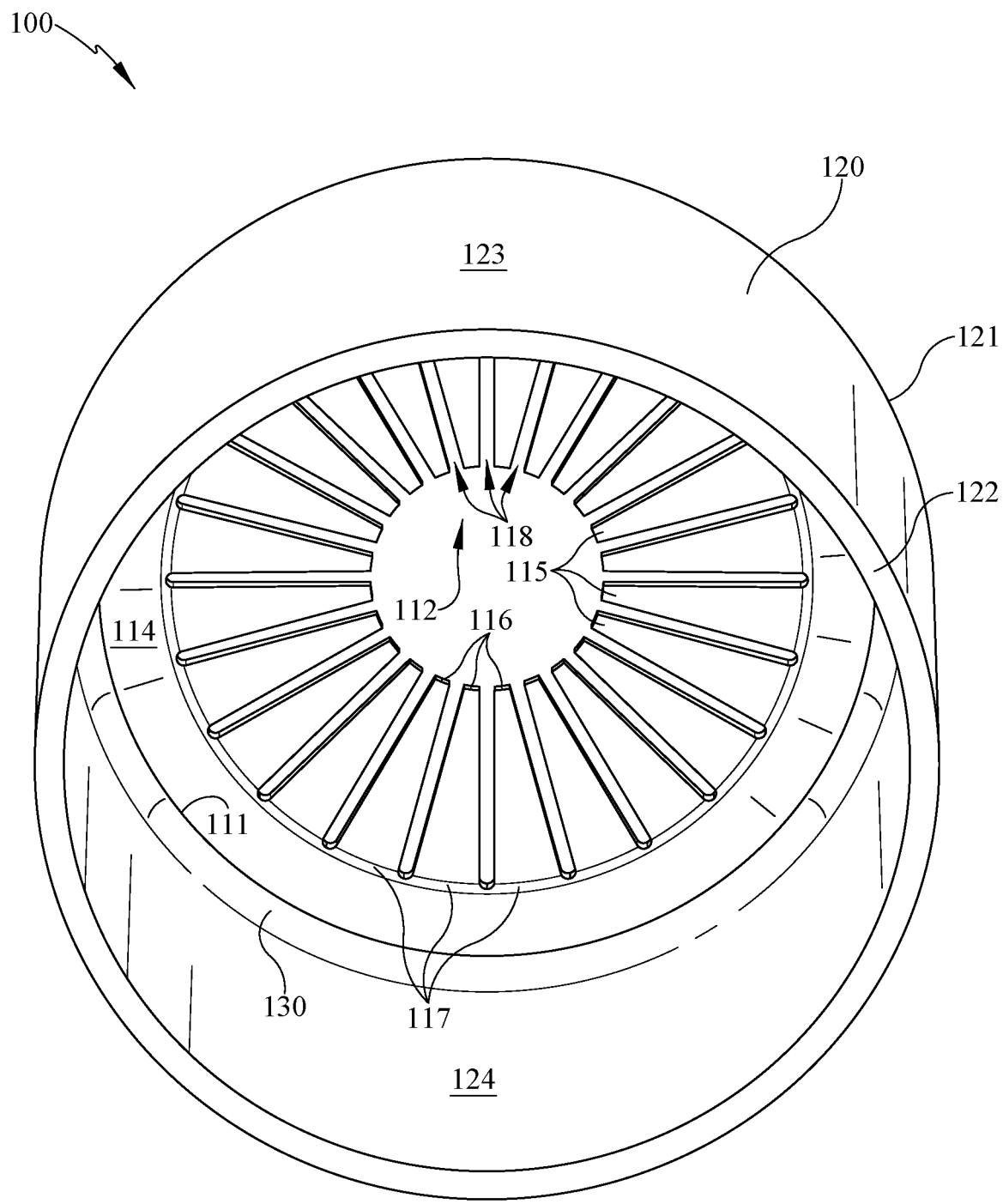
FIG. 4 illustrates a top perspective view of the curb stop device of FIG. 3.

Curb stop device 100 may include any or all of a bottom wall 110, an inner aperture 112, a plurality of slots 118, a side wall 120, and a shoulder 130, as shown for example in FIG. 3. Curb stop device 100 may be configured to engage, attach to, and/or couple with valve 55 and/or valve operating member. For example, a generally round or cylindrical valve body neck may extend upwardly from the water supply line, and curb stop device 100 may engage the valve body neck via insertion of the valve body neck into and/or through inner aperture 112 formed in bottom wall 110. If included, the valve body neck may include, for example, a flange having a larger outer dimension or diameter than other parts of the valve body neck. Inner aperture 112 may be smaller than the flange and/or curb stop device 100 may be configured to be flexible to accommodate attachment or insertion of the larger flange into it. Inner aperture 112 may be sized to a predetermined valve 55 or portion thereof, such as a valve body neck and/or flange.

In some embodiments, curb stop box 40, bottom portion 30, and/or bottom end 31 of bottom portion 30 may be inserted over and/or around at least a portion of curb stop device 100, for example, around side wall 120. Curb stop device 100 may be sized, shaped, and/or configured based on curb stop box 40, or vice versa, to facilitate, for example, engagement, installation, and/or coupling of curb stop box 40 and curb stop device 100. For example, if curb stop box 40, bottom portion 30, and/or bottom end 31 has a generally cylindrical inner surface or wall through which the aforementioned central passageway is defined, curb stop device 100 may have a generally cylindrical shape and/or an outer surface 123 of side wall 120 may have a generally cylindrical shape or otherwise a shape, size, and/or orientation that generally corresponds to the inner surface of bottom end 31 of curb stop box 40. For example, outer surface 123 may mate and/or form a friction fit with an inner surface of curb stop box 40, bottom portion 30, and/or bottom end 31 and/or may abut such an inner surface if curb box 40 or any portion thereof is moved slightly out of alignment. Side wall 120 and/or outer surface 123 may prevent or inhibit movement of curb stop box 40 out of alignment with valve 55. As discussed above, curb stop device 100 is not limited to water supply lines and/or associated equipment or apparatus, but may be used for other reasons as well as or instead of water supply, including but not limited to gas supply and/or other utilities or for any other reason.

Alternatively, as another example, curb stop box 40 may be inserted into an interior region of curb stop device 100, as may be defined for example by bottom wall 110 and/or side wall 120. In such an embodiment, an inner surface 124 of curb stop device 100 may mate, engage, and/or abut an outer surface of curb stop box 40, bottom portion 30, and/or bottom end 31, for example, to prevent or inhibit moving curb stop box 40 out of alignment with valve 55 and/or to help maintain alignment of curb stop box 40 with valve 55.

As shown in FIGS. 3 through 7, bottom wall 110 may be provided with a plurality of slots 118 separating one or more tabs 115. Tabs 115 may extend from tab bases 117 toward tab tips 116. Tab tips 116 may be proximate inner aperture 112. Tabs 115 may be at least partially separated by slots 118 to facilitate and/or allow tabs 115 to flex and/or act as cantilevers such that tips 116 may be deflected (e.g., up and down) relative to bases 117. Tab tips 116 may be deflectable to facilitate installing curb stop device 100 on valve 55 and/or to facilitate resilient coupling of curb stop device 100 on valve 55, and/or for any other reason.

Tabs 115 and/or tab tips 116 may be configured so that they are flexible and/or deflectable so that tips 116 may move up and down and/or radially inward and outward. Such flexure and/or deflection may allow or facilitate installation on valve 55 or other structure while also springing or biasing radially inward, for example to the position shown in FIGS. 3 through 7, to facilitate resilient engagement with valve 55 or underlying structure. Moreover, such flexure or deflection may allow use of a given embodiment of curb stop device 100, for example with inner aperture 112 having a given or predetermined diameter or size, with a plurality of sizes of valve bodies. For example, an embodiment of a curb stop device may have an inner aperture 112 with a diameter of approximately in the range of about 0.25" to about 3.0". For example, the inner aperture 112 may be in the range of about 0.75" to about 2.5", in the range of about 1.0" to about 1.5", and/or about 1.1875" (i.e. 1 3/16"). The deflection and/or flexure of tabs 115 may accommodate valve body diameters or widths in the range of about 0.25" to about 3.0", for example, in the range of about 0.75" to about 2.5", in the range of about 1.0" to about 1.5", and/or about 1.1875". Tabs 115 can narrow, in some embodiments, in size as one moves from the shoulder 130 to the aperture 112, forming the tab tips 116.

Figure 6:
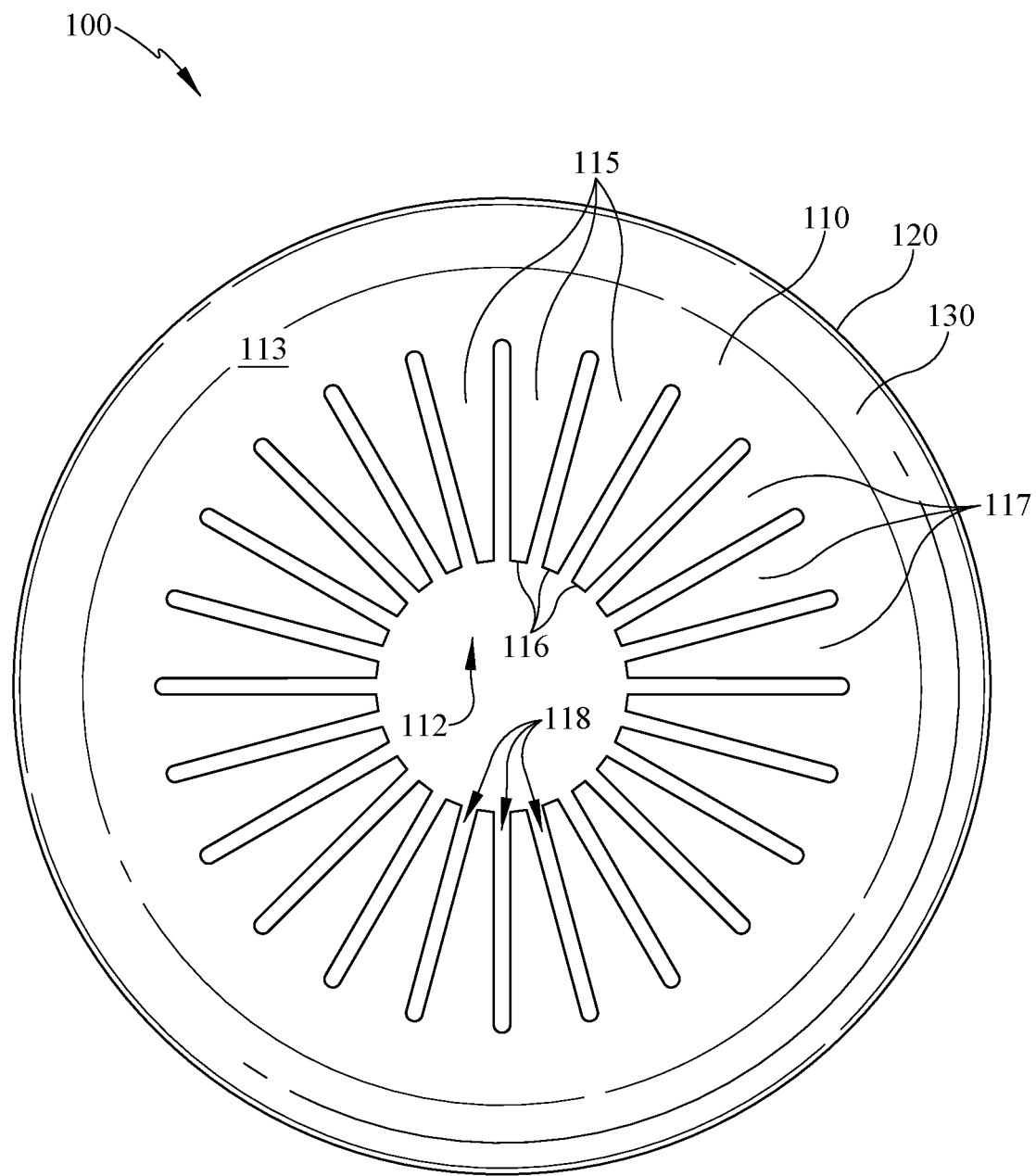
FIG. 6 illustrates a bottom view of the curb stop device of FIG. 3.
Figure 7:
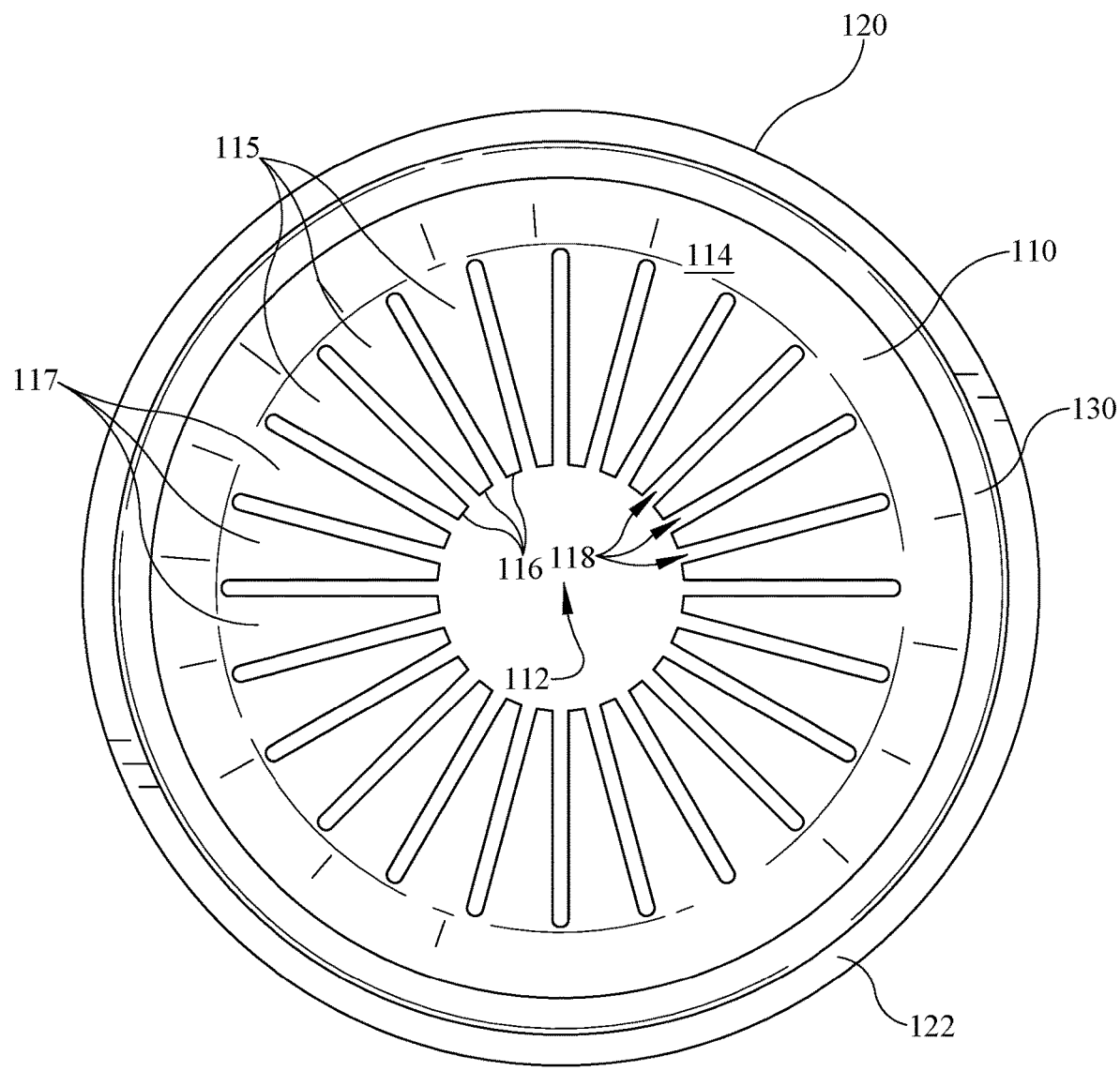
FIG. 7 illustrates a top view of the curb stop device of FIG. 3.

Inner aperture 112 may be substantially formed by and/or defined by tab tips 116, as shown for examples, in FIGS. 6 and 7. Tips 116 may be configured to flex or deflect up and/or down as necessary to accommodate a valve body or a variety of valve bodies. Tabs 115 may flex and/or rotate about base 117 and/or over the length of tabs 115. The geometry, structure, orientation, and/or material used to form tabs 115 may be modified to provide a given and/or predetermined amount of deflection and/or flexure. For example, in one embodiment of a curb stop device 100, there may be provided about 24 tabs 115, as shown for example in FIGS. 3, 4, 6 and 7. It is understood that more or less tabs 115 may be included. For example, curb stop device 100 may include a number of tabs 115 in the range of about 2 to about 1,000. Curb stop device 100 may include a number of tabs in the range of about 4 to about 100, of about 6 to about 60, of about 8 to about 40, and/or about 10 to about 30. Any or all of tabs 115 may have a thickness, measured from top to bottom of about 0.06" at tips 116 and/or of about 0.09" at base 117. Tabs 115 may have a length of about 0.8" to about 0.9" and may have a thickness taper angle of about 1 degree to about 2 degrees with tabs 115 thicker at base 117 and thinner at tip 116. Any or all of tabs 115 may be wider at base 117 and narrower at tip 116, for example, with a tip width of about 0.065" and a base width of about 0.30".

Any or all of tabs 115 may be separated by one or more slots 118. Slots 118 may be of any of a variety of shapes, sizes, and/or orientations. For example, as shown in FIGS. 3, 4, 6, and 7, slots 118 may have a length from base 117 to tip 116 of about 0.8" to about 0.9" and/or may have a width of about 0.065". It is understood that the example embodiment shown in the various figures having the aforementioned example dimensions and number of tabs and slots is provided for illustrative purposes only and curb stop device 100 may vary from this illustrated embodiment, for example, by varying the number of tabs and/or slots, and/or the size, shape, and/or orientation of any or all slots 118 or tabs 115 or any component thereof. For example, slots 118 may vary in width along the length of any or all slots, and/or may vary in width from one slot 118 to another slot 118. Tabs 115 and/or any component thereof may vary from one tab 115 to another tab 115. Tabs 115 and/or slots 118 may extend in relatively straightforward radial inward fashion as shown in the figures or may include curvature in any direction and/or be relatively free form or the like. It is understood that an example of an alternative embodiment might include one or more tabs 115 of substantially uniform width that may be accommodated in a cylindrical curb stop device 100 with one or more slots 118 having varying width over its length. It is further understood that tabs 115 may be formed and/or configured such that they are easily modified in the field to accommodate various sizes, shapes, orientations, and/or configurations of valves, for example, by trimming or cutting the tips 116 from tabs 115 to accommodate a larger diameter or width valve 55, for example.

Figure 5:
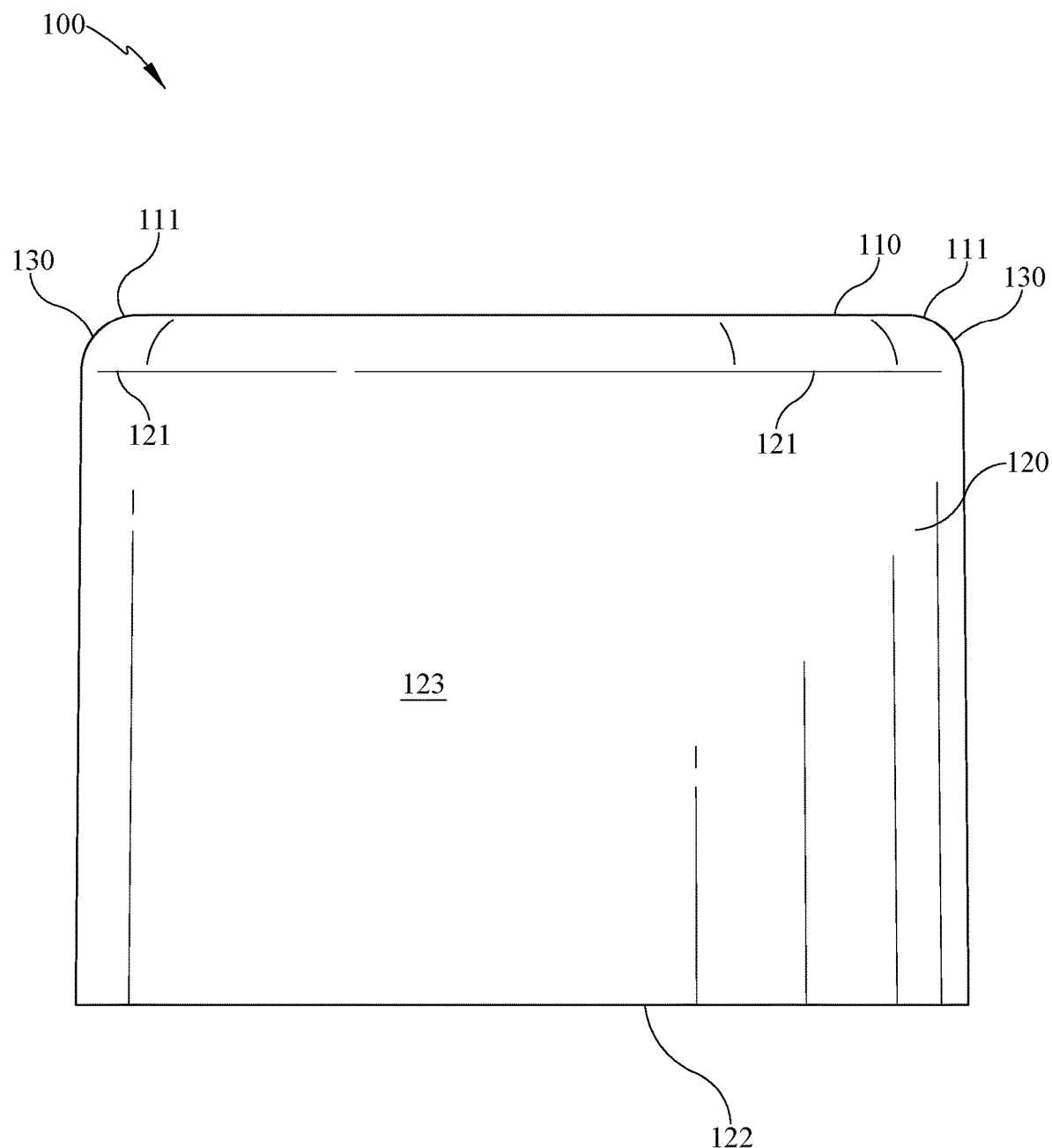
FIG. 5 illustrates a side view of the curb stop device of FIG. 3.

As shown in FIGS. 3 through 7, curb stop device 100 may include a shoulder 130 between side wall 120 and bottom wall 110 for any of a variety of purposes and to provide a transition therebetween. For example, shoulder 130 could be angled and/or rounded as shown to facilitate handling, insertion, installation, and/or to reduce stress concentrations. It is understood that shoulder 130 is optional. If included, shoulder 130 may extend from an outer edge 111 of bottom wall 110 to a bottom edge 121 of side wall 120. Shoulder 130 may provide a transition that is consistent and/or continuous outwardly in the radial direction and/or upwardly in the axial direction from outer edge 111 of bottom wall 110 to bottom edge 121 of side wall 120, as shown for example in FIG. 1. In FIG. 5, curb stop device 100 is shown in an upside-down orientation with bottom wall 110 above side wall 120 and with shoulder 130 providing a consistent and continuous transition between outer edge 111 and bottom edge 121. Bottom wall 110 may extend from outer edge 111 radially inwardly toward inner aperture 112. Side wall 120 may extend upwardly from bottom edge 121 to a top edge 122. Curb stop box 40 may be inserted over top edge 122 and/or at least partially over side wall 120. Alternatively, top edge 122 may at least partially define a top opening into which at least a portion of curb stop box 40 may be inserted into the interior region of curb stop device 100 defined by side wall 120 and bottom wall 110. Bottom wall 110 and/or shoulder 130 may be configured to provide a floor or resting point for a bottom edge or end of a predetermined curb stop box or range of curb stop box sizes, shapes, and/or configurations. For example, shoulder 130 may be configured to support a bottom edge of a curb stop box so that curb stop box does not interfere with the flexibility and/or deflectability of bottom wall 110 and/or any or all tabs 115, for example, by stopping insertion of the curb stop box beyond a given distance and/or to prevent it from contacting bottom wall top surface 114.

A bottom wall bottom surface 113 and/or a side wall outer surface 123 may be provided, for example, to at least partially define an outer boundary of curb stop device 100 and/or to prevent or inhibit ingress of debris, particulate matter, fluid, or any other matter or combination thereof from the outside of curb stop device 100 and/or associated curb stop box 40 to the inside thereof. For example, outer surface 123 and/or bottom surface 113 may be substantially solid and/or impermeable to at least some matter, such as gravel, dirt, sand, water, or the like. Slots 118 may be sized, shaped, oriented, and/or configured to prevent or inhibit ingress of some matter while also providing flexibility or deflectability of tabs 115. Moreover, slots 118 may be sized, shaped, oriented, and/or configured to prevent or inhibit such ingress while allowing such flexibility or deflectability while also allowing egress of some fluid matter, such as water, that might otherwise accumulate within curb stop device 100.

In the embodiment shown in FIGS. 3 through 7, curb stop device 100 is shown having a substantially cylindrical shape with a substantially uniform height around its perimeter or circumference as measured, for example, from bottom surface 113 and/or bottom surface outer edge 111 to side wall top edge 122. In one exemplary embodiment, this height of curb stop device 100 may be about 3.0" although it is understood that this height may be varied. In this embodiment, the outer diameter of curb stop device 100, measured for example at outer surface 123, is about 3.875" and the inner diameter, measured for example at inner surface 124, is about 3.625". The thickness of side wall 120 in this example is about 0.25". In some embodiments, an outer diameter of curb stop device 100 may be in the range of about 0.5" to about 8" or more. It is understood that side wall 120 and/or bottom wall 110 may have any of a variety of thicknesses, may differ from one another in thickness, and/or either or both may have variable thickness throughout.

In use, curb stop box 40 and/or curb stop device 100 may be used, for example, by locating the underground water supply line valve 55. Curb stop device 100 may be coupled with the underground supply line valve 55, for example, by passing valve 55 and/or valve operating member 60 into and/or through inner aperture 112, wherein the curb stop device 100 has at least one outer dimension configured to engage bottom end 31 of bottom portion 30 and/or curb stop box 40. Curb stop box 100 may be coupled to curb stop device 100 so that bottom end 31 of curb stop box 40 is at least partially lower than top edge 122 of curb stop device 100 so that an inner passageway of curb stop box 40 is in alignment with valve 55 and/or valve operating member 60. A tool may be passed through the inner passageway of curb stop box 40 to engage valve operating member 60, for example, to open or close valve 55 and/or turn on or turn off water flow out $W_2$ and/or to turn valve 55 between an open position and a closed position.

It is understood that while curb stop device 100 is shown as generally cylindrical in nature in the various figures, it is not limited to being cylindrical. For example, the interior region defined by inner surface 124 may be cylindrical while outer surface 123 is another shape such as polygonal, square, rectangular, free form, etc., or vice versa, for example. Curb stop device 100 may be a monolithic structure and/or a monolithic piece, meaning that side wall 120, bottom wall 110, and/or shoulder 130 are formed together of a single piece of material and are continuous. Moreover, curb stop device 100 could be formed with other than the generally uniform diameter or thickness shown in the various figures. For example, curb stop device 100, side wall 120, and/or any portion thereof could be conical, frustoconical, pyramidal, and/or have variable diameter, width, length, etc. Side wall 120, bottom wall 110, and/or any portion thereof may be uniform thickness or may be varying in thickness throughout.

It is further understood that, while some directional terms are used herein, such as top, bottom, upper, lower, inner, outer, upward, downward, etc., and variants thereof, these terms are not intended to be limiting but rather to relate to one or more exemplary orientations, positions, and/or configurations of curb stop box 40 and/or curb stop device 100, and/or any component thereof. It is understood that curb stop box 40, curb stop device 100, and/or any component or portion thereof may be inverted or re-oriented to face or point a different direction without departing from the nature of curb stop device 100 disclosed herein.

In one embodiment, the curb stop device is made from a polymeric material. The polymeric material can be any material that provides a sufficient amount of rigidity to the curb stop device for its intended purpose. In one embodiment, the polymeric material comprises polypropylene. The polypropylene can be a polypropylene that is a blended or compounded polypropylene with a filler. In one embodiment, the filler can be talc. Specifically, in one embodiment, the curb stop device can be made of a 20% talc filled polypropylene. One example of a talc filed polypropylene is available from Sabic, Sabic® PPCOMPOUND 3020B. Sabic® PPCOMPOUND 3020B is a 20% talc filled polypropylene.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint and independently of the other endpoint.

"Optional" or "optionally" means that the subsequently described event or circumstance may or may not occur and that the description includes instances where said event or circumstance occurs and instances where it does not. The terms "substantial" or "substantially" may encompass the whole as specified, according to certain embodiments, or largely but not the whole specified according to other embodiments.

Throughout the description and claims of this specification, the word "comprise" and variations of the word, such as "comprising" and "comprises," means "including but not limited to," and is not intended to exclude, for example, other additives, components, integers, or steps. "Exemplary" means "an example of" and is not intended to convey an indication of a preferred or ideal embodiment. "Such as" is not used in a restrictive sense but for explanatory purposes.

Disclosed are components that can be used to perform the disclosed methods, equipment, and systems. These and other components are disclosed herein, and it is understood that when combinations, subsets, interactions, groups, etc. of these components are disclosed while specific reference of each various individual and collective combinations and permutation of these may not be explicitly disclosed, each is specifically contemplated and described herein, for all methods, equipment, and systems. This applies to all aspects of this application including, but not limited to, steps in disclosed methods. Thus, if a variety of additional steps exist that can be performed, it is understood that each of these additional steps can be performed with any specific embodiment or combination of embodiments of the disclosed methods.

It will be apparent to those skilled in the art that various modifications and variations can be made without departing from the scope or spirit of the present disclosure. Other embodiments will be apparent to those skilled in the art from consideration of the specification and practice disclosed herein. It is intended that the specification and examples be considered as exemplary only.

I claim:

1. A curb stop assembly, comprising:
  a curb stop box and a curb stop device;
  the curb stop box having a top portion disposed opposite a bottom portion;
  wherein the bottom portion of the curb stop box is configured to receive the curb stop device;
  wherein the bottom portion of the curb stop box includes a bottom end and a flange adjacent the bottom end, wherein the flange extends radially outwardly away from the bottom end;
  the curb stop device including a side wall configured to engage the bottom portion of the curb stop box;
  the curb stop device having an inner aperture formed in a bottom wall, the inner aperture configured to receive at least a portion of a valve;
  the curb stop device having a shoulder providing a radial transition between the bottom wall and the side wall;
  the curb stop device having a plurality of flexible tabs arranged around the inner aperture, each of the flexible tabs extending from a base coupled to the bottom wall radially inwardly toward a tip proximate the inner aperture; and
  a plurality of slots, each slot of the plurality of slots extending radially between each tab of the plurality of flexible tabs;
  wherein the tabs are configured to flex axially upwardly and downwardly to accommodate the at least a portion of a valve and to engage the valve to maintain the valve in alignment with the curb stop box.

2. The curb stop assembly of claim 1, wherein the top portion is removably attachable to the bottom portion.

3. The curb stop assembly of claim 2, wherein the curb stop box has a height that is adjustable by threaded engagement of the top portion and the bottom portion.

4. The curb stop assembly of claim 2, wherein the top portion and the bottom portion are removably attachable by a threaded engagement.

5. The curb stop assembly of claim 2, wherein the curb stop device side wall has a cylindrical shape and the curb stop box has a cylindrical recess configured to receive the curb stop device side wall.

\* \* \* \* \*